INVENTOR.
DENNIS L. OTTO
BY
ATTORNEYS

United States Patent Office 3,523,692
Patented Aug. 11, 1970

3,523,692
PATTERNED SEALING FACE FOR SHAFT SEALS
Dennis L. Otto, Canton, Ohio, assignor to The Timken Roller Bearing Company, Canton, Ohio, a corporation of Ohio
Filed May 17, 1967, Ser. No. 639,168
Int. Cl. F16r *41/00;* F16j *15/54*
U.S. Cl. 277—25     9 Claims

ABSTRACT OF THE DISCLOSURE

A shaft seal having a patterned sealing face to return lubricant leakage to the lubricant side of the sealing face by reintroducing the leakage in the lubricant film at the sealing face by a patterned sealing face configuration which impells the lubricant back into the film through centrifugal action of the pattern in the sealing face. The patterned configuration in the sealing face operates for reversible shaft rotation.

---

This invention relates to improvements in shaft seals and is particularly directed to novel and useful means for causing the seal to function to return lubricant leakage into the film that exists between the seal face and the shaft.

The problem with present types of shaft seals is that the lubricant fluid leaks out to the air side of the seal creating a constant loss of lubricant fluid and establishing an area adjacent the seal where dirt can collect. Leakage usually develops when the lubricant film is ruptured which action forms an avenue for the passage of the lubricant fluid outwardly. Minute imperfections in the seal face or rough areas on the shaft, or both conditions can cause leakage to begin, and once it has started there is no easy way to check it.

Therefore, an important object of this invention is to provide a novel shaft seal in which a patterned seal face is formed to function as an impeller whereby the lubricant is constantly forced to reenter the lubricant side of the seal.

It is another important object of this invention to provide a shaft seal with means to pump the lubricant back to the lubricant side of the seal and thus prevent leakage.

It is also an object of this invention to provide a rotating shaft with lubricant seal means that has a patterned sealing face which functions during shaft rotation to maintain a lubricant film flow that will constantly keep the lubricant within the limits of the seal face and for reintroducing the lubricant to the area of the patterned seal face so that leakage is substantially prevented from beginning.

Another object of this invention is to provide a shaft seal with a sealing face formed with depressions or patterns of depressions which act as pump vanes to force the lubricant to remain at the sealing face or to return to the lubricant side of the seal for either unidirectional shaft rotation or reversible shaft rotation.

Other objects and advantages of this invention will be disclosed in greater detail as the specification proceeds to set forth certain preferred embodiments which are shown in the accompanying drawings, wherein.

Figure 1:
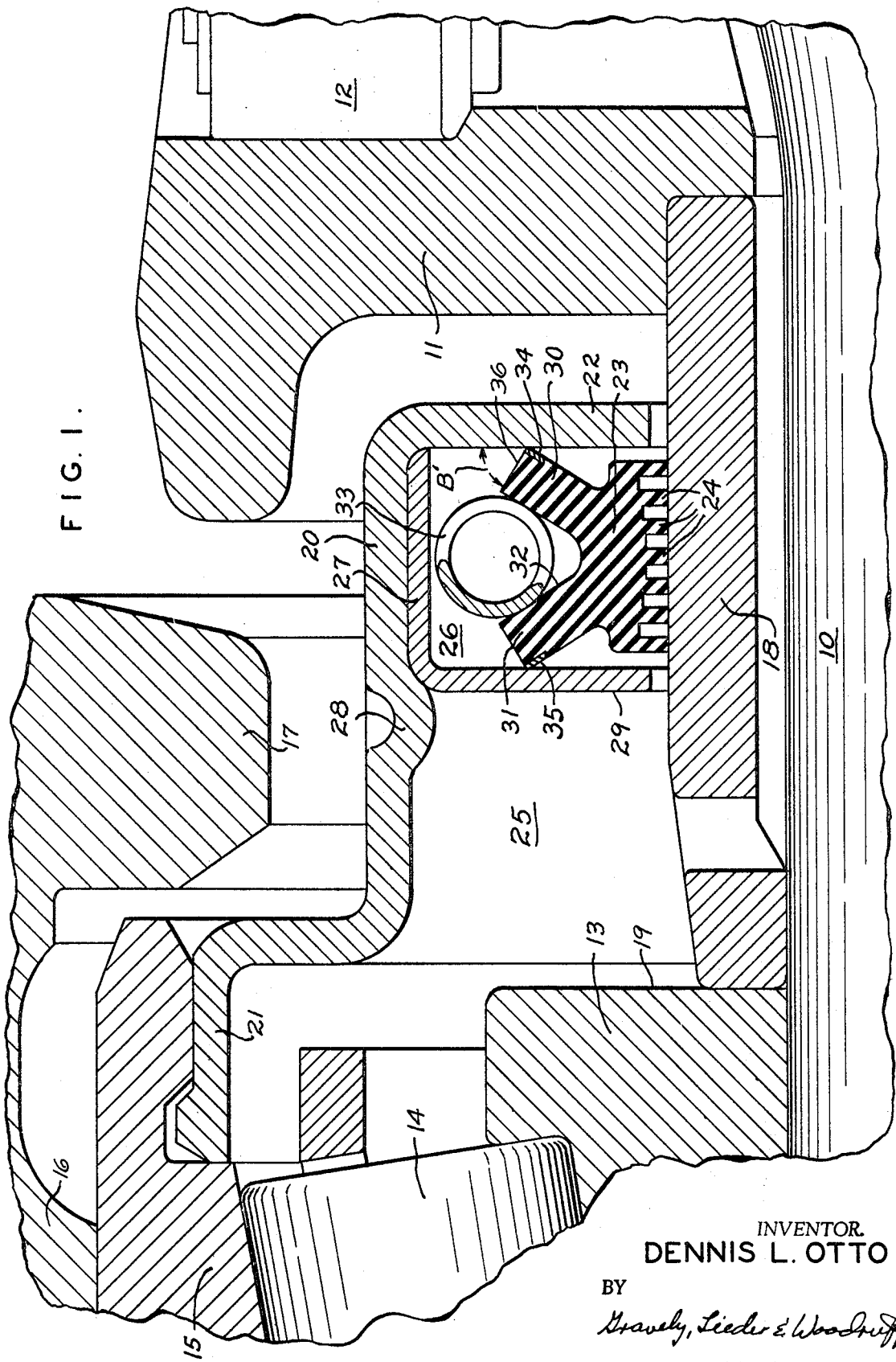
FIG. 1 is a fragmentary sectional elevational view of a shaft and shaft bearing assembly in which the present seal is incorporated.

In FIG. 1, the assembly includes a shaft 10 having a backing ring 11 mounted thereon with a suitable vent fitting 12 mounted in the backing ring. The shaft 10 is fitted with a bearing cone 13 for anti-friction tapered rollers 14 and a cup 15 enclosed the rollers 14. The bearing cup 15 is mounted in a suitable adapter housing 16 having the annular lip 17 thereof spaced from the backing ring 11. The bearing cone is maintained in proper position by a spacer ring 18 located between the thrust rib end 19 of the cone 13 and the backing ring 11. A seal casing 20 of cup form is mounted by its axial flange 21 on the bearing cup 15 such that the radial flange 22 overlies the spacer ring 18.

The shaft seal unit within the case 20 includes the seal body 23 of rubber or other suitable resilient material fitted onto the spacer ring 18 by a series of annular ribs 24 forming a labyrinth type barrier to the passage of lubricant fluid from the bearing space 25 to the air space 26 of the casing. The seal body 23 is enclosed by a retainer having a circumferential wall 27 staked at 28 into the case and a radial wall 29 spaced from the case end wall 22. The seal body 23 is formed with bifurcated arms 30 and 31 which diverge to form an annular notch or seat 32 in which a circumferential garter type spring 33 is mounted. The spring means 33 urges the seal arms 30 and 31 into face sealing engagement with the smooth seal surfaces on the respective walls 22 and 29 of the case. In this embodiment, the arms 30 and 31 of the seal body are provided with molded-in-place Teflon lips or tips 34 and 35 respectively, which tips have continuous sealing surfaces which engage the case walls at their seal surfaces in the manner illustrated.

Figure 2:
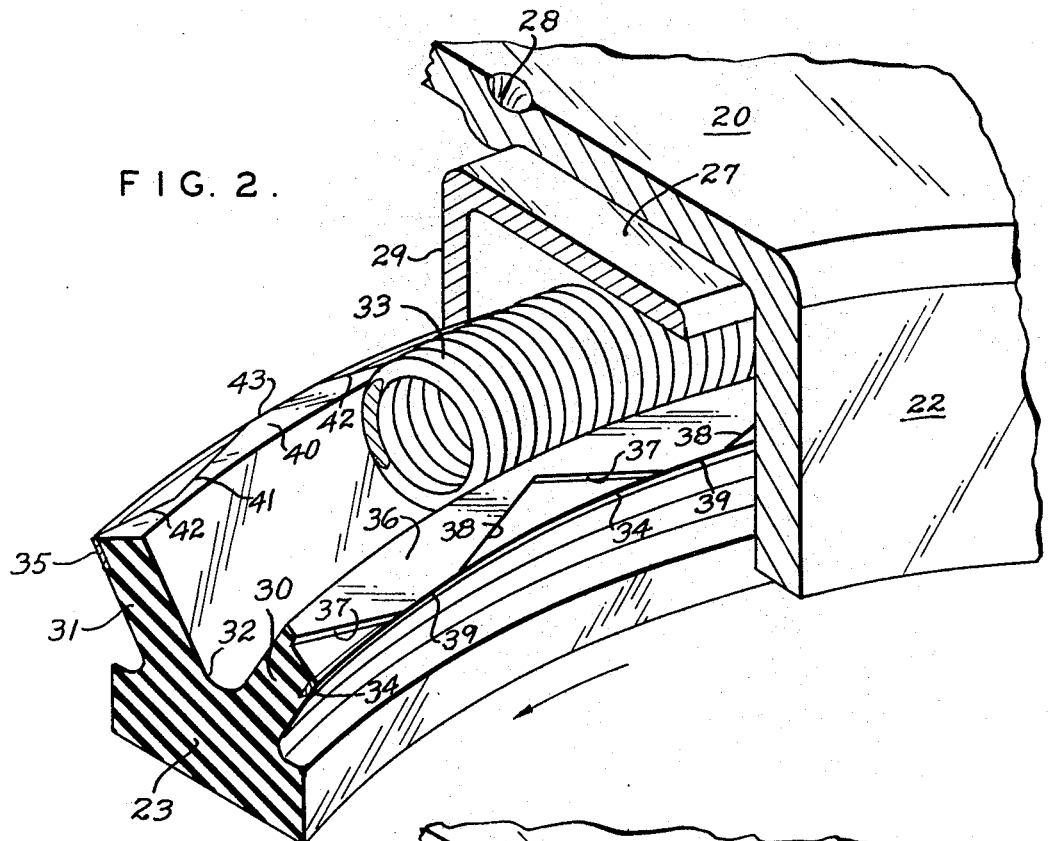
FIG. 2 is a fragmentary perspective view of the shaft seal, the better to show the details of the invention.

Turning now to FIG. 2 it can be seen that the outer end face 36 of the seal arm 30 has a patterned configuration of triangular depressions separated by embossments at edge walls 37 and 38. The wall 38 of one pattern depression is spaced by a lobe area 39 from the next adjacent wall 37. The outer end face 40 of the other seal arm 31 is similarly formed with a patterned configuration of triangular depressions defined with edge walls 41 and 42 and intervening spacer edge walls 43.

Figure 3:
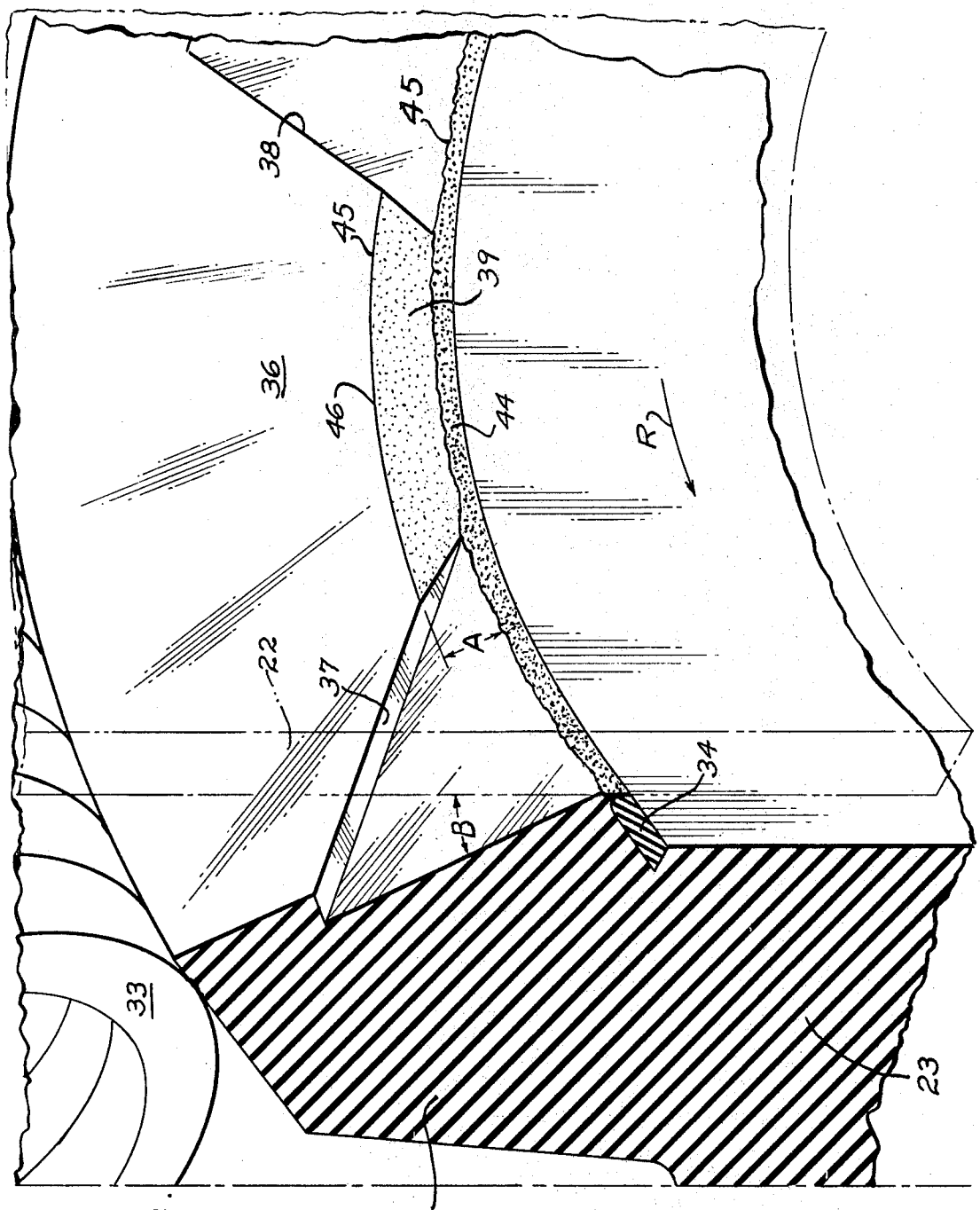
FIG. 3 is a greatly enlarged perspective view of the shaft seal to show the functioning of the patterned seal face, the view being presented as if the seal case were transparent.

The greatly enlarged view of FIG. 3 illustrated the function of two adjacent patterned depressions in the seal face of one arm 30 of the lubricant seal body 23. The view is seen through the case wall 22 as if such wall were transparent. In this view the pattern of triangular depressions in the end face 36 are bidirectional in operation; that is, the depressions in the seal body 23 are intended to perform the intended function in either direction of rotation of the seal body 23 and the shaft 10 relative to the stationary casing wall 22. In the view shown the rotation is counterclockwise as shown by arrow R.

During the operation the corner portion of the seal end face at the insert 34 is supported from the stationary case wall 22 by a primary lubricant film which is maintained only in that portion of the seal face depicted by the stippled band indicated at 44. The lower edge of the band 44 is at the insert 34 and the upper edge of this same band is defined by the meniscus surface which follows an irregular line 45. This meniscus 45 is formed at the air-lubricant interface due to surface tension effects, and the meniscus 45 forms the air side of the lubricant film 44. The extent of the width of this lubricant film zone (or band) 44 is dependent upon the viscosity, temperature, contact force exerted by the garter spring means 33 and the condition of the surface of the end face 36 and wall 22. It is also observed that the lobe area 39 of the end face 36 between the depressions will have a wider contact band 46 which is unlubricated unless leakage occurs. The band 46 is depicted by the lightly stippled area in FIG. 3.

The side or edge walls 37 and 38 of the patterned depressions are deeper in comparison with the thickness of the lubricant film in band 44. This fact is difficult to illustrate, but it is believed it can be visualized due to the depth of the edges 37 in FIG. 3. The lubricant side of the seal is below the Teflon insert 34 and the air side is above the meniscus 45, as viewed in FIG. 3. It is noted that, in the example depicted, the effective helix length A on the seal edge 37 is approximately 250 times as large as the lubricant film thickness, and this length is determined by the depth of the edge 37 and the approach angle B. The effective helix length also increases somewhat with wear as the sealing arm 30 pivots toward the wall 22 for the type of seal body 23 shown, but this is not a requirement for effective seal performance.

In operation lubricant leakage occurs when the film is ruptured resulting in a mist of lubricant being expelled to the air side of the film. The particle diameter of this mist must be of the order of magnitude of the lubricant film thickness from which it is expelled. Therefore, the leakage particle diameter is very small in comparison with the effective helix length of the patterned depressions. For example, the present invention deals with lubricant fluid seals operating on film of approximately 0.0001 inch, and the width of the primary lubricant film 44 as shown in FIG. 3 may be of the order of approximately 0.010 inch adjacent to the fluid side of the seal body 23. In one example of a seal of the type shown in FIG. 3 the effective helix length was approximately 0.025 inch which, it can be appreciated, is of the order of 250 times as large as the lubricant film thickness.

Looking now at FIG. 3, and with the seal body 23 moving relative to the stationary casing wall 22 in the direction of the arrow R, it can be appreciated that leakage particles which are expelled from the lubricant film into the void space at the lobe area 46 between the trailing wall 37 of one depression and the leading wall 38 of the following depression come into contact with either the end surface of lobe 46 on the seal body 23 or with the adjacent stationary surface of the wall 22. Such particles have a radial velocity component and in making such contact this velocity component is decreased. This occurs since a lubricant film is maintained for only a band width of approximately 0.010 inch adjacent to the fluid side of the seal body, and this means that the remainder of the contact area is a gap of approximately the same thickness as the diameter of the leakage particles. When the lubricant particles are emitted from the film they are expelled tangentially from the air side of the lubricant film 44, and when these particles contact both the end face in the lobe area 46 of the seal 23 and the stationary casing wall 22 the radial velocity component is reduced to zero and a partial unstable fluid film is formed between the lobe area 46 and the wall 22 will be subject to the same shear action found in the primary lubricant film 44. On lip or face seals that do not have the patterned depressions, the unstable partial fluid film is permitted to be further expelled because of fluid film rupture or because of the outwardly pumping tendency of rough surfaces on the seal or the casing wall or both. As a result, permanent leakage is an experienced hazard for such prior seal designs.

In the present embodiment of FIG. 3 the unstable fluid film is ruptured abruptly by the depressions or triangular shaped voids formed on the seal end face 36. Prior to film rupture a velocity distribution exists in the fluid film so that the layer adjacent to the wall 22 is stationary and the layer adjacent to the seal end face lobe 46 has the velocity of the seal body 23 rotating with the shaft 10. When film rupture occurs it is sheared so that a portion adheres to the wall 22 and a portion adheres to the lobe 46. Free particles may also exist as a result of the rupture and these free particles will be contacted by the edge wall 37 of each depression as this wall is in the trailing position with respect to the direction of rotation. Each trailing wall 37 will act as a pumping vane, and the free fluid particles will be engaged by the trailing wall because the particles have a velocity less than that of the moving seal face 36. Furthermore, the free particles' velocity will be further decreased after rupture because of air drag. Accordingly, the action which takes place is that the helically directed edge walls 37 will act as pumping vanes and reintroduce the fluid particles into the primary lubricant film 44 so that leakage is substantially prevented. Particles will also adhere to the wall 22 and these will also be reintroduced into the primary lubricant film 44 because they too will be engaged by the trailing edges 37 of the patterned depressions on the end face 36 after attaining sufficient size to bridge the gap between the seal end face lobe 46 and the wall 22.

Lubricant particles which adhere to the seal end face lobe 46 will again form a partial unstable fluid film as they grow in size sufficient to bridge the gap between the moving and stationary parts of the seal assembly. Fuid film rupture again will result and the cycle described above will be repeated. Since the cycle is a continuing series of events the particles of the fluid film that might otherwise tend to leak will be constantly returned to the primary lubricant film 44.

It can be appreciated that the free fluid particles which are expelled into the patterned depressions do so upon movement tangentially out of the primary lubricant film 44 and they move with a velocity which prevails in the lubricant film. Those particles which have a velocity near that of the moving seal face 36 may escape as permanent leakage if the width of the patterned depressions, as measured in the circumferential direction, is too great and the shaft rotary speed too low. Also, this would occur if the velocity difference between the seal body 23 and the particles is small enough that the particles can reach a radial distance from the contact band, which is greater than the effective helix length, without coming into contact with the trailing edge of the depression. Only a small proportion of the lubricant particles will have velocities near that of the seal end face 36 and those particles would need to be expelled near the leading edge 38 of a patterned depression in order to be regarded as a permanent leakage. As shaft speeds increase, leakage tendency decreases since the air drag on the free lubricant particles increases with speed, thereby resulting in more rapid deceleration of the particles and decreasing the probability of escape by increasing the velocity difference with the moving seal end face 36. It should now be appreciated that the sealing performance of a patterned lubricant seal improves as the size of the depressions and the space between such depressions decreases. Optimum patterned sealing face is produced with the smallest depression and with the smallest spacing between depressions that can be maintained in service without being obliterated by wear.

In the embodiment shown in FIG. 3 the pattern of depressions formed in the end face 36 of the arm 30 is repeated for the end face 40 in the arm 31. It is therefore unnecessary to describe the action which occurs for the patterned depression in the seal end face 40 as it is in all respects similar to that above described. It should furthermore, be appreciated that in the embodiment thus far disclosed and described the pattern of depressions is such that leakage will be prevented in either direction of rotation of the seal body 23 relative to the stationary casing wall 22 as the edge walls 38 will function as the trailing edges and perform in the same way as is performed by the edge walls 37. Accordingly the embodiment of FIG. 3 is effective for either direction of rotation of the seal body 23.

Figure 4:
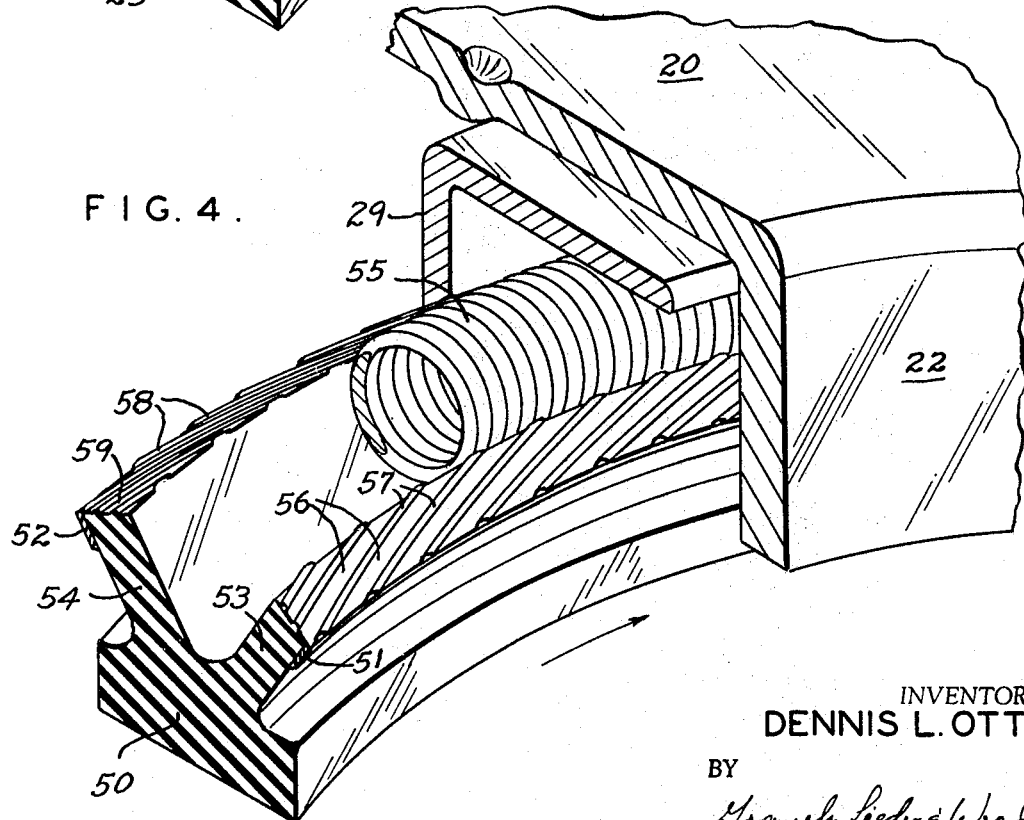
FIG. 4 is a fragmentary perspective view of an alternate shaft seal showing another embodiment of the invention.

Turning now to FIG. 4 it can be seen that the seal case 20 encloses a seal body 50 which is similar in general configuration to the previously described seal body 23. However, in this case the seal body 50 is provided with Teflon lips 51 and 52 on the respective divergent arms 53 and 54. The Teflon lips 51 and 52 are pressed into engagement against the end faces of the casing end wall 22 and the retainer 29 by the garter spring means 55 seated between the end surface of the arms 53 and 54. The outer end face 56 of arm 53 is provided with a series of closely spaced helical flutes or depressions 57 that have similar helix angles, and in the view of FIG. 4 the seal body 50 moves in a clockwise direction, as indicated by the arrow, relative to the stationary walls 22 and 29. This direction of rotation must be adhered to in order to obtain the pumping action and reintroduction of the free lubricant particles to the lubricant side of the seal. Thus, the embodiment of FIG. 4 is unidirectional in its effect and it is more efficient since the flutes or depressions 57 can be located much closer together without detracting from the overall resistance to obliteration by wear. Similar helical flutes or depressions 58 are formed in the end face 59 of the arm 54. These latter flutes 58 form the same helix angle with the stationary wall 29 so that substantially uniform action results therefrom as is described for the flutes 57.

It should, of course, be understood that the Teflon lips 34 and 35 of the embodiment of FIG. 2 and the molded-on lips 51 and 52 of the embodiment shown in FIG. 4 may be interchangeably applied. It should also be understood that the principles of the present invention are susceptible of use with lubricant seals of other forms than that disclosed provided that the seal operates in conjunction with a wall face which either is stationary when the seal moves or moves when the seal is stationary. In other words, there must be relative movement in order for the patterned depressions in the sealing face to function in the manner described.

Turning again to FIG. 1, it is pointed out that in order to best utilize the patterned sealing face principle of this invention on a face type seal, that is one in which the seal engages the face of a wall such as casing wall 22, the end face 36 should form an acute angle B' with the face of the wall 22 on the dust or air side of the seal. Furthermore, this acute angle B' must be very small, of the order of about 5° to 45° for high speed applications so that the effective helix A can overcome the centrifugal force exerted on the lubricant fluid particles by the rotation. As has been pointed out above, the patterned sealing face of the present embodiments function upon relative movement by returning microscopic leakage of the lubricant fluid to the lubricant side of the seal by constantly reintroducing the leakage particles to the lubricant film, and it is the helically directed adjacent wall of the patterned depressions that impells the fluid particles back into the film by overcoming the centrifugal force due to rotation. An advantage of this patterned fluid seal, in addition to retarding or substantially preventing leakage, is that it improves the hydro-dynamic lubricant established in the lubricant film and this in turn will decrease sealing wear and lower operating temperatures, thereby increasing the useful life of the seal.

While a preferred embodiment of the present invention has been shown in the several views of the accompanying drawings, it is understood that alterations, variations, and changes will occur to those skilled in the art after becoming aware of the improvements directed and disclosed herein. It is intended, therefore, to include all such changes, variations and alterations within the spirit and scope of the appended claims.

What is claimed is:

1. A seal for retaining a lubricant between first and second relatively moveable members, the latter of which has a continuous seal surface; said seal comprising a body mounted on the first member for movement therewith, a lip on the body biased toward the second member, the lip having a continuous sealing surface which bears against the continuous seal surface on the second member and forms a primary contact area in which a portion of the lubricant exists as a substantially continuous lubricant film, a patterned end face on the body and extending away from the contact area at an oblique angle relative to the continuous seal surface on the second member, the end face having depressions which are defined in part by edge walls intersecting the end face, the portions of the end face between the depressions terminating at lobe areas which are continuous with the sealing surface of the lip and bear against the seal surface on the second member, the edge walls being presented at acute angles with respect to the general direction of the relative movement at the contact area whereby the edge walls function as pump impellers in the presence of lubricant particles, the edge walls defining each depression being angularly related to form two sides of a triangular shape for the depression whereby at least some of the edge walls are oriented such that lubricant emitted from the film is directed back toward the film when relative movement between the first and second members occurs.

2. The patterned seal improvement set forth in claim 1 wherein one of said edge walls of each triangular shaped depression causes a rupture in the lubricant film adjacent said primary contact area, and lubricant particles freed into said depression by said rupture are impelled back into the lubricant film upon contact by the other of said edge walls of the depression.

3. The improvement in sealing rotary shaft bearing against loss of lubricant comprising: a stationary seal case adjacent the shaft bearing; a shaft mounted lubricant seal enclosed in said case, said seal having a continuous lip portion engaged on a continuous interior surface of said case to divide the case interior into a lubricant side and an air side relative to a primary lubricant film contact area; and means carried by said seal and cooperating with said lip portion to substantially prevent lubricant loss through said primary contact area and past said lip portion from the lubricant to the air sides thereof, said means including a series of alternate embossments and depressions, the embossments having spaced edge walls that intersect said lip portion at acute angles and form with said lip portion alternate voids and lobes moving past the stationary interior surface of said case, each lobe providing a contact area which forms a continuation of the primary lubricant film contact area, the surfaces of adjacent embossments and depressions being generally parallel and at an oblique angle with respect to the interior surface of the case at the area of contact with the lip portion, the acute angle of at least some of the edge walls being such that lubricant which escapes from the primary contact areas is impelled back to the primary contact area.

4. The improvement set forth in claim 3 wherein said edge walls are angularly divergent and intersect said lip portion at acute angles to form one patterned depression, and adjacent patterned depression being spaced apart by said lobe contact area.

5. The improvement set forth in claim 3 wherein said spaced edge walls are substantially parallel and intersect said lip portion at acute angles, said edge walls cooperating in pairs to prevent lubricant loss.

6. A seal for a rotary shaft, said seal comprising a seal case having a pair of axially spaced circumferential walls provided with inwardly presented continuous seal surfaces, the seal case being mounted such that the shaft rotates relative to it; a flexible seal body mounted on the shaft for rotation therewith, the seal body having a pair of integrally formed outwardly and circumferentially extending arms which are spaced axially from one another at their outer ends in the formation of an outwardly opening annular groove between them on the seal body, the arms at their outer ends having lips provided with continuous sealing surfaces of finite width which bear against the seal surfaces and form primary contact areas in which lubricant exists as substantially continuous films, the arms terminating at patterned end faces presented at oblique angles to the seal surfaces on the adjacent circumferential walls, the end faces having circumferentially spaced depressions which are defined in part by edge walls in the faces, the edge walls being presented at acute angles to the contact area whereby the edge walls function as pump impellers as the seal body rotates relative to the seal case, at least some of the edge walls being oriented such that the lubricant emitted from the film is directed back toward the film when relative rotation between the shaft and seal case occurs; and a garter spring extending through the groove and engaging the seal body at the arms so that the embracive force exerted by the spring tends to spread the arms, the sealing surfaces on the lips engaging the seal surfaces at substantially the same radius from the axis of rotation at which the spring engages the arms whereby the lips are urged tightly against the seal surfaces on the circumferential arms.

7. A seal according to claim 6 wherein the portions of the end faces between the depressions terminate at lobe areas which are continuous with the sealing surfaces of the lips and bear against the seal surfaces on the circumferential walls.

8. A seal according to claim 7 wherein the edge walls defining each lobe area diverge from one another away from the seal surface on the adjacent circumferential wall, whereby one edge will serve as an impeller in one direction of relative movement and the other edge will serve as an impeller in the opposite direction of relative movement so that the lubricant will be returned to the films irrespective of the direction of relative movement.

9. A seal according to claim 7 wherein the edge walls extend in the same direction whereby the depressions are generally helical.

References Cited

UNITED STATES PATENTS

| 2,210,823 | 8/1940 | Victor et al. | 277—25 |
| 2,958,551 | 11/1960 | Rogers | 277—134 X |
| 3,048,413 | 8/1962 | Wood | 277—96 X |

FOREIGN PATENTS

| 1,227,078 | 2/1960 | France. |
| 1,101,074 | 3/1961 | Germany. |
| 1,469,429 | 1/1967 | France. |

OTHER REFERENCES

Paper No. 67 WA/Lub–11, Zero Leakage by R. L. Dega, July, 1967, pp. 10, 11 and 12.

SAMUEL ROTHBERG, Primary Examiner

U.S. Cl. X.R.
277—41, 96, 134